(12) United States Patent
Brevnov

(10) Patent No.: US 11,532,808 B2
(45) Date of Patent: Dec. 20, 2022

(54) PRE-LITHIATION PROCESS FOR ELECTRODE BY DRY DIRECT CONTACT TO LITHIUM TARGETS

(71) Applicant: Applied Materials, Inc., Santa Clara, CA (US)

(72) Inventor: Dmitri A. Brevnov, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 165 days.

(21) Appl. No.: 16/439,971

(22) Filed: Jun. 13, 2019

(65) Prior Publication Data

US 2019/0393480 A1     Dec. 26, 2019

Related U.S. Application Data

(60) Provisional application No. 62/688,352, filed on Jun. 21, 2018.

(51) Int. Cl.
*H01M 4/82* (2006.01)
*H01M 4/139* (2010.01)
(Continued)

(52) U.S. Cl.
CPC ........... *H01M 4/139* (2013.01); *H01M 4/043* (2013.01); *H01M 4/0471* (2013.01);
(Continued)

(58) Field of Classification Search
CPC .... H01M 4/139; H01M 4/1393; H01M 4/043; H01M 4/0435; H01M 4/0471;
(Continued)

(56) References Cited

U.S. PATENT DOCUMENTS 4,002,492 A * 1/1977 Rao ........................ H01M 4/581
429/337
9,958,508 B2 * 5/2018 Okayama ............. G01R 31/389
(Continued)

FOREIGN PATENT DOCUMENTS

CN         107154499        9/2017
KR      20050038905 A      4/2005
(Continued)

OTHER PUBLICATIONS

Korean Office Action dated Oct. 8, 2021 for Application No. 10-2020-7011471 (APPM/24776KRP).

*Primary Examiner* — Raymond Alejandro
(74) *Attorney, Agent, or Firm* — Patterson + Sheridan, LLP

(57) ABSTRACT

Lithium ion batteries, methods of making the same, and equipment for making the same are provided. In one implementation, a method of fabricating a pre-lithiated electrode is provided. The method comprises disposing a lithium metal target comprising a layer of lithium metal adjacent to a surface of a prefabricated electrode. The method further comprises heating at least one of the lithium metal target and the prefabricated electrode to a temperature less than or equal to 180 degrees Celsius. The method further comprises compressing the lithium metal target and the prefabricated electrode together while applying ultrasound to the lithium metal target to transfer a quantity of lithium from the lithium metal target to the prefabricated electrode.

20 Claims, 3 Drawing Sheets

(51) Int. Cl.
  *H01M 10/0525* (2010.01)
  *H01M 4/04* (2006.01)
  *H01M 4/40* (2006.01)
  *H01M 4/38* (2006.01)

(52) U.S. Cl.
  CPC ........... *H01M 4/382* (2013.01); *H01M 4/405* (2013.01); *H01M 10/0525* (2013.01)

(58) Field of Classification Search
  CPC ...... H01M 4/382; H01M 4/381; H01M 4/405; H01M 4/40; H01M 10/0525; H01M 10/052
  See application file for complete search history.

(56) References Cited

U.S. PATENT DOCUMENTS

| | | | |
|---|---|---|---|
| 2009/0148773 A1* | 6/2009 | Volkov | H01M 4/1393 429/231.5 |
| 2016/0181594 A1* | 6/2016 | Balogh | H01M 4/139 156/247 |
| 2017/0324073 A1 | 11/2017 | Herle | |
| 2017/0365854 A1 | 12/2017 | Gopalakrishnannair et al. | |
| 2020/0136198 A1* | 4/2020 | Kasumzade | H01M 10/44 |

FOREIGN PATENT DOCUMENTS

| | | |
|---|---|---|
| KR | 20120032044 A | 4/2012 |
| WO | 2017/131997 A1 | 8/2017 |

\* cited by examiner

PRE-LITHIATION PROCESS FOR ELECTRODE BY DRY DIRECT CONTACT TO LITHIUM TARGETS

CROSS-REFERENCE TO RELATED APPLICATIONS

This application claims benefit of U.S. provisional patent application Ser. No. 62/688,352, filed Jun. 21, 2018, which is incorporated herein by reference in its entirety.

BACKGROUND

Field

Implementations described herein generally relate to pre-lithiated electrodes, high performance electrochemical cells and batteries including the aforementioned pre-lithiated electrodes, and methods for fabricating the same.

Description of the Related Art

Rechargeable electrochemical storage systems are currently becoming increasingly significant for many fields of everyday life. High-capacity electrochemical energy storage devices, such as lithium-ion (Li-ion) batteries, are used in a growing number of applications, including portable electronics, medical, transportation, grid-connected large energy storage, renewable energy storage, and uninterruptible power supply (UPS). Traditional lead/sulfuric acid batteries often lack the capacitance and are often inadequately for these growing applications. Lithium-ion batteries, however, are thought to have the best chance.

Typically, lithium batteries do not contain any metallic lithium for safety reasons but instead use a graphitic material as the anode. However, the use of graphite, which, in the charged state can be charged up to the limit composition $LiC_6$, results in a much lower capacitance, in comparison with the use of metallic lithium. Currently, the industry is moving away from graphitic-based anodes to silicon-blended graphite to increase energy cell density. However, silicon blended graphite anodes suffer from first cycle capacity loss.

Thus, there is a need for pre-lithiation methods to replenish first cycle capacity loss of silicon blended graphite anodes.

SUMMARY

Implementations described herein generally relate to lithium ion batteries, methods of making the same, and equipment for making the same. In one implementation, a method of fabricating a pre-lithiated electrode is provided. The method comprises disposing a lithium metal target comprising a layer of lithium metal adjacent to a surface of a prefabricated electrode. The method further comprises heating at least one of the lithium metal target and the prefabricated electrode to a temperature less than or equal to 180 degrees Celsius. The method further comprises compressing the lithium metal target and the prefabricated electrode together while applying ultrasound to the lithium metal target to transfer a quantity of lithium from the lithium metal target to the prefabricated electrode.

In another implementation, a lithium-ion battery cell is provided. The lithium-ion battery cell comprises a pre-lithiated negative electrode, a positive electrode comprising oxides of a transition metal, and an electrolyte. The electrolyte is selected from a solid electrolyte, a liquid electrolyte, or a polymer electrolyte. The pre-lithiated electrode is formed by a method comprising disposing a lithium metal target comprising a layer of lithium metal adjacent to a surface of a prefabricated electrode. The method further comprises heating at least one of the lithium metal target and the prefabricated electrode to a temperature less than or equal to 180 degrees Celsius. The method further comprises compressing the lithium metal target and the prefabricated electrode together while applying ultrasound to the lithium metal target to transfer a quantity of lithium from the lithium metal target to the prefabricated electrode.

In yet another implementation, an integrated processing system operable to form a pre-lithiated electrode is provided. The integrated processing system comprises a reel-to-reel system operable to transport a continuous sheet of material through one or more processing chambers. The integrated processing system further comprises a pre-lithiation module that defines a processing region and is adapted to process the continuous sheet of material. The pre-lithiation module further comprises a lithium metal target operable to contact and supply lithium to the continuous sheet of material. The pre-lithiation module further comprises a press coupled with the lithium metal target and operable to move the lithium metal target into contact with the continuous sheet of material. The pre-lithiation module further comprises one or more ultrasonic transducers positioned in the processing region and operable to apply ultrasonic energy to the lithium metal target. The pre-lithiation module further comprises one or more heat sources positioned in the processing region and operable to heat the lithium metal target.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1A:
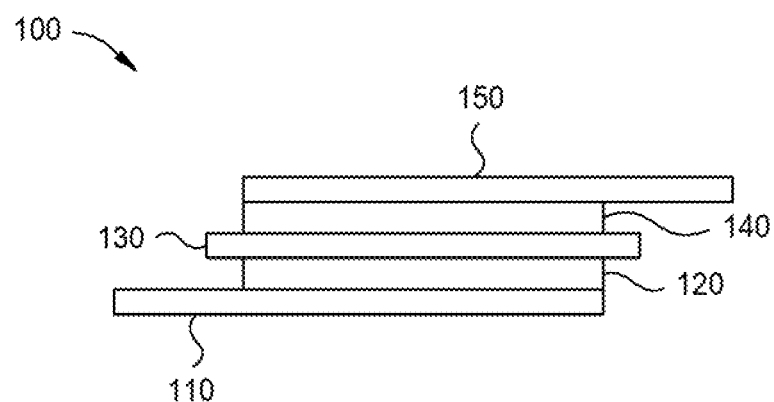
FIG. 1A illustrates a cross-sectional view of one implementation of an energy storage device including a pre-lithiated electrode structure formed according to implementations described herein.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes pre-lithiated electrodes, high performance electrochemical cells and batteries including the aforementioned pre-lithiated electrodes, and methods for fabricating the same. Certain details are set forth in the following description and in FIGS. 1A-3 to provide a thorough understanding of various implementations of the disclosure. Other details describing well-known structures and systems often associated with electrochemical cells and batteries are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Implementations described herein will be described below in reference to a roll-to-roll coating system, for example, TopMet™, SMARTWEB®, TopBeam™, all of which are available from Applied Materials, Inc. of Santa Clara, Calif. Other tools capable of manufacturing electrodes may also be adapted to benefit from the implementations described herein. In addition, any system enabling the pre-lithiation processes described herein can be used to advantage. The apparatus description described herein is illustrative and should not be construed or interpreted as limiting the scope of the implementations described herein. It should also be understood that although described as a roll-to-roll process, the implementations described herein may also be performed on discrete substrates.

Current state of the art lithiation processes suffer from technical issues and/or high costs. For example, lithium evaporation processes have low lithium utilization and are typically performed in high vacuum, which leads to higher costs. Stabilized lithium metal powder (SLMP) processes suffer from poor uniformity and long formation times. Organic bath electrochemical pre-lithiation is a wet process and thus presents issues with handling. Pre-lithiation with thin lithium foils is problematic due to the difficulties with thin lithium foil manufacturing. Pre-lithiation with lithium salt additives is costly. The pre-lithiation processes described herein provide reduced pre-lithiation time at lower costs as compared to currently available pre-lithiation processes.

Implementations described herein include pre-lithiation processes for pre-lithiating coated electrodes (negative, positive) used in the lithium-ion batteries. The pre-lithiation processes described herein are applicable to lithium-ion batteries using solid electrolytes (e.g., solid-state batteries) as well as lithium-ion batteries, which use liquid or polymer electrolytes. The pre-lithiation processes described herein are enabled by dry direct contact (DDC) between lithium metal targets and coated electrodes while controlling at least one of a temperature of the lithium metal target, pressure between the lithium target and the coated electrode, and/or the application of ultrasound (i.e., ultrasonic energy). The residence time for pre-lithiation of the coated electrodes described herein is controlled and shortened by controlling temperature, pressure, ultrasound frequency band and/or intensity. Pre-lithiation of coated electrodes allows for (1) an increase in the lithium-ion battery energy density (kWh), and (2) reduction of the cathodic coating loading for the anode/cathode balancing, specifically the costly elements of cobalt and nickel. Thus, pre-lithiation process described herein has a direct impact on the main figure of merit, cost/kWh, used in the lithium-ion battery manufacturing (HVP). Not to be bound by theory, but it is believed that ultrasound enhances the diffusion coefficient in solids at least by one order of magnitude thus reducing diffusion time. The pre-lithiation process described herein is suitable for any coated electrodes: either negative or positive. The pre-lithiation process described herein provides battery manufacturers with great flexibility in cell balancing: independently matching reversible anode/cathode capacities, irreversible anode/cathode capacities.

In some implementations, of the present disclosure lithium solid-state diffusion is thermodynamically driven ($\Delta G<0$) from thick (>100 μm) lithium targets (~300 mm×300 mm) to coated electrodes (either anodes or cathodes) by direct and dry contact between double-sided coated foils and lithium metal targets. Process controls for controlling the pre-lithiation process described herein include temperature, which is below or at the same temperature used for drying the coated electrodes, for example, less than or equal to 181 degrees Celsius. The process controls further include pressure, which is at or below the pressure used for forming the coated electrode, for example less than or equal to 1 mPA). Additional process controls include ultrasound with frequency band(s) for example, in the range of about 20 KHz to about 1 GHz and intensity, for example, in the range of about 0.1 to about 100 Watts/cm$^2$ applied to the lithium targets. Not to be bound by theory, but it is believed that ultrasound enhances the diffusion coefficient in solids at least by one order of magnitude, and reduces the diffusion time for pre-lithiation. These process controls applied to lithium targets induce/accelerate lithium diffusion and reduce the residence time (e.g., 1-60 minutes), for pre-lithiation of an electrode coating with X mg/cm$^2$ active material loading, Y μm thickness and Z % porosity. The pre-lithiation process described herein includes engagement of the lithium target and prefabricated electrode, lithium diffusion from the lithium metal target into the prefabricated electrode, and separation of the lithium metal target from the prefabricated electrode. In some implementations, after separation, each lithium target becomes 0.2 to 20 μm thinner.

FIG. 1A illustrates a cross-sectional view of one implementation of an energy storage device 100 including a pre-lithiated electrode structure formed according to implementations described herein. The energy storage device 100 may be a lithium-ion energy storage device that uses solid electrolytes (e.g., a solid-state battery) as well as a lithium-ion energy storage device, which uses a liquid or polymer electrolyte. The energy storage device 100 has a positive current collector 110, a positive electrode 120, a separator 130, a negative electrode 140, and a negative current collector 150. At least one of the positive electrode 120 and the negative electrode 140 are pre-lithiated according to the implementations described herein. Note in FIG. 1A that the current collectors are shown to extend beyond the stack, although it is not necessary for the current collectors to extend beyond the stack, the portions extending beyond the stack may be used as tabs.

The current collectors 110, 150, on positive electrode 120 and negative electrode 140, respectively, can be identical or different electronic conductors. Examples of metals that the current collectors 110, 150 may be comprised of include aluminum (Al), copper (Cu), zinc (Zn), nickel (Ni), cobalt (Co), tin (Sn), silicon (Si), manganese (Mn), magnesium (Mg), alloys thereof, and combinations thereof. In one implementation, at least one of the current collectors 110, 150 is perforated. Furthermore, current collectors may be of any form factor (e.g., metallic foil, sheet, or plate), shape and micro/macro structure. Generally, in prismatic cells, tabs are formed of the same material as the current collector and may be formed during fabrication of the stack, or added later. All components except current collectors 110 and 150 contain lithium-ion electrolytes.

The negative electrode 140 or anode may be any material compatible with the positive electrode 120. The negative electrode 140 may be pre-lithiated according to the implementations described herein. The negative electrode 140 may have an energy capacity greater than or equal to 372 mAh/g, preferably ≥700 mAh/g, and most preferably ≥1000 mAh/g. The negative electrode 140 may be constructed from a carbonaceous material (e.g., natural graphite or artificial graphite), silicon-containing graphite, silicon, nickel, copper, tin, indium, aluminum, silicon, oxides thereof, combinations thereof, or a mixture of a lithium metal and/or lithium alloy and materials such as carbon (e.g. coke, graphite), nickel, copper, tin, indium, aluminum, silicon, oxides thereof, or combinations thereof. In one implementation, the negative electrode 140 comprises intercalation compounds containing lithium or insertion compounds containing lithium. In some implementations, the negative electrode 140 is a silicon graphite anode. Suitable examples of carbonaceous materials include natural and artificial graphite, partially graphitized or amorphous carbon, petroleum, coke, needle coke, and various mesophases.

The material that forms the negative electrode can be in disperse form such as powders, fibers, or flakes. In these implementations, the negative electrode 140 can be manufactured by any method known in the art such as by preparing slurry from a carbonaceous powder and a binder agent, applying the slurry onto/into a current-collector, and drying. If employed, the binder agent can be chosen from such compounds including, but not limited to, polyvinylidene fluoride (PVDF), ethylene-propylene diene monomer (EPDM), ethylene vinyl acetate copolymer (EVA), and combinations thereof.

The positive electrode 120 or cathode may be any material compatible with the anode and may include an intercalation compound, an insertion compound, or an electrochemically active polymer. Suitable intercalation materials include, for example, lithium-containing metal oxides, $MoS_2$, $FeS_2$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Suitable polymers include, for example, polyacetylene, polypyrrole, polyaniline, and polythiophene. The positive electrode 120 or cathode may be made from a layered oxide, such as lithium cobalt oxide, an olivine, such as lithium iron phosphate, or a spinel, such as lithium manganese oxide. Exemplary lithium-containing oxides may be layered, such as lithium cobalt oxide ($LiCoO_2$), or mixed metal oxides, such as $LiNi_xCo_{1-2x}MnO_2$, $LiNiMnCoO_2$ ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Exemplary phosphates may be iron olivine ($LiFePO_4$) and it is variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$.

Exemplary silicates may be $Li_2FeSiO_4$, $Li_2MnSiO_4$, or $Li_2VOSiO_4$. An exemplary non-lithium compound is $Na_5V_2(PO_4)_2F_3$.

In some implementations of a lithium-ion cell according to the present disclosure, lithium is contained in atomic layers of crystal structures of carbon graphite ($LiC_6$) at the negative electrode and lithium manganese oxide ($LiMnO_4$) or lithium cobalt oxide ($LiCoO_2$) at the positive electrode, for example, although in some implementations the negative electrode may also include lithium absorbing materials such as silicon, and/or tin. The cell, even though shown as a planar structure, may also be formed into a cylinder by reeling the stack of layers; furthermore, other cell configurations (e.g., prismatic cells, button cells) may be formed.

In one implementation, the separator 130 is a porous polymeric ion-conducting polymeric substrate. In one implementation, the porous polymeric substrate is a multi-layer polymeric substrate. In some implementations, the separator 130 includes any commercially available polymeric microporous membranes (e.g., single or multi-ply), for example, those products produced by Polypore (Celgard LLC., of Charlotte, N.C.), Toray Tonen (Battery separator film (BSF)), SK Energy (lithium ion battery separator (LiBS), Evonik industries (SEPARION® ceramic separator membrane), Asahi Kasei (Hipore™ polyolefin flat film membrane), and DuPont (Energain®).

In some implementations where the energy storage device 100 is a solid-state battery, the separator 130 is replaced by a lithium-ion conducting glass. The lithium-ion conducting material may be a lithium-ion conducting ceramic or a lithium-ion conducting glass. The Li-ion conducting material may be comprised of one or more of LiPON, doped variants of either crystalline or amorphous phases of $Li_7La_3Zr_2O_{12}$, doped anti-perovskite compositions, $Li_2S$—$P_2S_5$, $Li_{10}GeP_2S_{12}$, and $Li_3PS_4$, lithium phosphate glasses, $(1-x)LiI$—$(x)Li_4SnS_4$, $xLiI$—$(1-x)Li_4SnS_4$, mixed sulfide and oxide electrolytes (crystalline LLZO, amorphous $(1-x)LiI$—$(x)Li_4SnS_4$ mixture, and amorphous $xLiI$—$(1-x)Li_4SnS_4$) for example. In one implementation, x is between 0 and 1 (e.g., 0.1, 0.2, 0.3, 0.4, 0.5, 0.6, 0.7, 0.8, and 0.9).

In some implementations, the electrolyte infused in cell components 120, 130, and 140 can be comprised of a liquid/gel or a solid polymer and may be different in each. In some implementations, the electrolyte primarily includes a salt and a medium (e.g., in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, BETTE electrolyte (commercially available from 3M Corp. of Minneapolis, Minn.) and combinations thereof. Solvents may include, for example, ethylene carbonate (EC), propylene carbonate (PC), EC/PC, 2-MeTHF(2-methyltetrahydrofuran) /EC/PC, EC/DMC (dimethyl carbonate), EC/DME (dimethyl ethane), EC/DEC (diethyl carbonate), EC/EMC (ethyl methyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF: chlorotrifluoroethylene) PAN (polyacrylonitrile), and PEO (polyethylene oxide).

Figure 1B:
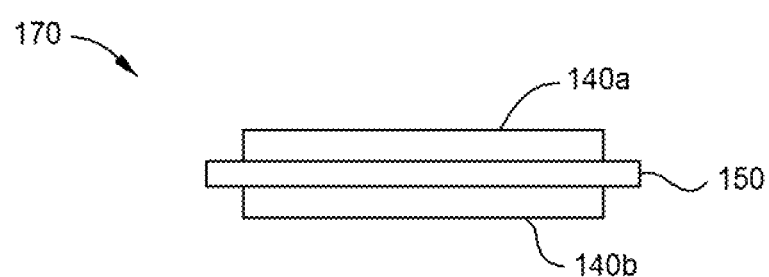
FIG. 1B illustrates a cross-sectional view of a dual-sided electrode structure that is pre-lithiated according to implementations described herein.

FIG. 1B illustrates a cross-sectional view of a dual-sided electrode structure 170 that is pre-lithiated according to implementations described herein. The dual-sided electrode structure 170 comprises the current collector 150 with a negative electrode structure 140a, 140b formed on opposing sides of the current collector 150.

Figure 2:
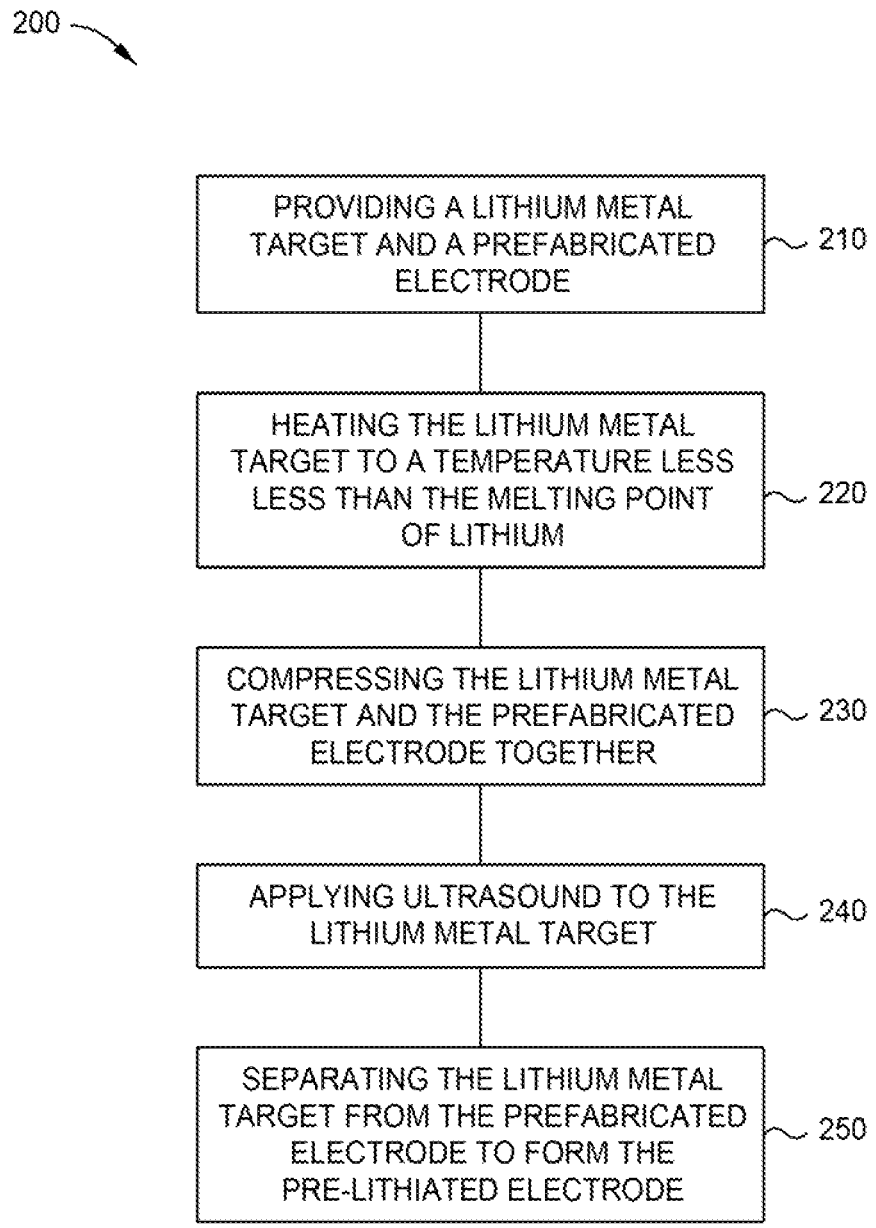
FIG. 2 illustrates a process flow chart summarizing one implementation of a processing sequence of pre-lithiating an electrode structure according to implementations described herein.

FIG. 2 illustrates a process flow chart summarizing one implementation of a processing sequence 200 of pre-lithiating an electrode structure according to implementations described herein. The processing sequence 200 may be used to pre-lithiate a single-sided electrode structure, for example, the electrode structures depicted in FIG. 1A, or a dual-sided electrode structure, for example, the electrode structure depicted in FIG. 1B.

The processing sequence 200 begins at operation 210 by providing a lithium metal target and a prefabricated electrode. The prefabricated electrode may be a negative electrode (anode electrode), for example, the negative electrode 140 formed on current collector 150, or a positive electrode (cathode electrode), for example, the positive electrode 120 formed on current collector 110.

The lithium metal target can be in various forms. For example, the lithium metal target can be in the form of, but is not limited to, blocks, wire, strips, and plates. Typically, the piece of lithium metal is a block. In one implementation, the block has a thickness greater than or equal to about 100 μm. It has been found by the inventors that a thickness greater than 100 microns allows for separation of the lithium metal target from the prefabricated electrode without damaging either the lithium metal target or the prefabricated electrode. In one implementation, the lithium metal target is composed of lithium metal or a lithium metal alloy. In one implementation, the lithium metal target includes an alloying element. In one implementation, the alloying element is selected from aluminum, titanium, magnesium, copper, zirconium, or a combination thereof. In one implementation, the alloying element is present in from about 0.1 wt. % and 10 wt. % of the total weight of the lithium metal target. In one implementation, the block has a thickness greater than or equal to about 100 μm. The block can be of various thicknesses, typically having a thickness ranging from about 100 μm to about 3 centimeters, for example, from about 1 centimeter to about 3 centimeters. In one implementation, the lithium target has a thickness of about 1 centimeter, a length of about 10 centimeters, and a width of about 10 centimeters.

At operation 220, the lithium metal target is heated to a temperature less than the melting point of lithium (180.5 degrees Celsius). In one implementation, the lithium metal target is heated to a temperature less than or equal to 180 degrees Celsius. In another implementation, the lithium metal target is heated to a temperature less than or equal to 150 degrees Celsius. In one implementation, the lithium metal target is heated to a temperature within a range from about 50 degrees Celsius to about 180 degrees Celsius, more narrowly within a range from about 100 degrees Celsius to about 170 degrees Celsius, and more narrowly within a range from about 100 degrees Celsius to about 150 degrees Celsius.

At operation 230, the lithium metal target and the prefabricated electrode are compressed together while applying ultrasound to lithiate the prefabricated electrode. The heating, applied pressure, and ultrasonic energy facilitate transfer of lithium to the prefabricated electrode where the lithium is incorporated into the active material of the prefabricated electrode. In one implementation, the lithium metal target and the prefabricated electrode are compressed together in an atmosphere comprising an inert gas. The inert gas is selected from nitrogen ($N_2$), helium (He), neon (Ne), argon (Ar), krypton (Kr), xenon (Xe), radon (Rn), and combinations thereof. In one implementation, the inert gas is argon gas. In another implementation, the atmosphere comprises argon and nitrogen.

In one implementation, a pressure applied for compressing the lithium metal target to the prefabricated electrode is within a range from about 0.1 MPa to about 20 MPa, more narrowly within a range from about 0.1 MPa to about 10 MPa more narrowly within a range from about 1 to about 10 MPa, more narrowly within a range from about 2 to about 5 MPa. The pressure may be a uniform pressure applied to a back surface of the lithium metal target. In one implementation, the anode electrode is generally made by pressing the lithium metal target to the prefabricated electrode with a magnitude of pressure insufficient to damage the prefabricated electrode. In other words, the pressure is such that the prefabricated electrode is not mechanically destroyed or degraded, such as by cracking or crushing. The pressure depends upon, for example, the active material of the prefabricated electrode and the thickness of the lithium metal target. A variety of devices can be used to apply the uniform pressure. Devices include, but are not limited to, mechanical presses, hydraulic presses, and pneumatic presses. The magnitude of pressure is generally high; however, as described above, the pressure should be of a magnitude as to not damage the prefabricated electrode. Typically, it is preferred that distribution of the pressure, during application, is as uniform as possible.

At operation 240, ultrasound is applied to the lithium metal target. In another implementation, ultrasound is applied to the prefabricated electrode. In yet another implementation, ultrasound is applied to both the lithium metal target and the prefabricated electrode. In one implementation, the exposure to ultrasonic waves from the ultrasound occurs at a frequency within a range from about 20 kHz to about 1 GHz, more narrowly within a range from about 40 kHz to about 1,000 kHz, and more narrowly within a range from about 100 kHz to about 200 kHz. In one implementation, the exposure to ultrasonic waves from the ultrasound occurs at a power density within a range from about 0.1 watts/cm$^2$ to about 100 watts/cm$^2$, more narrowly within a range from about 10 watts/cm$^2$ to about 80 watts/cm$^2$, more narrowly within a range from about 20 watts/cm$^2$ to about 50 watts/cm$^2$. It is believed that the application of ultrasound to the lithium metal target enhances the diffusion coefficient in solids by at least one order of magnitude, and reduces the diffusion time for pre-lithiation.

With the principles of the present disclosure, a quantity of lithium transferred to the electrode can be controlled by adjusting the time (duration of contact between the lithium metal target and the surface of the prefabricated electrode), pressure applied, ultrasonic energy applied, and/or temperature. After contacting, for example, pressing, the lithium metal target with the prefabricated electrode in the atmosphere together, the prefabricated electrode and the lithium metal target are typically stored in the atmosphere for a period of time. In some implementations, the period of time is sufficient to completely lithiate the prefabricated electrode. In one implementation, the period of time is within a range from about 1 minute to about 60 minutes, more narrowly within a range from about 15 minutes to about 45 minutes, and more narrowly within a range from about 20 minutes to about 40 minutes. The period of time sufficient to achieve targeted lithiation of the prefabricated electrode may be determined by a feedback process.

It should be understood that the heating process of operation 220, the compression process of operation 230, and the application of ultrasound during the process of operation 240 may be performed simultaneously, sequentially in any order, and/or may partially overlap with each other.

At operation 250, the lithium metal target is separated from the prefabricated electrode to form the pre-lithiated electrode. The separation and removal of the lithium metal target permits good control over the amount of lithium transferred, but also avoids any physical issues that may arise from the presence of a residual layer, such as small pieces fracturing and forming a physical barrier to the pores of the prefabricated electrode. In addition, the thickness of the lithium metal target allows for easy separation of the lithium metal target from the pre-lithiated electrode due to the higher cohesive forces in the solid body of the lithium metal target. After separation, the pre-lithiated electrode may be exposed to additional processing, for example, a cooling process.

In some implementations, after separation, a passivation layer is present on the lithium metal target. The passivation layer may be a lithium oxide, lithium hydroxide, and/or lithium carbonate passivation layer. The passivation layer may be removed from the lithium metal target by mechanical scrubbing with a blade and/or nylon brush. In addition, debris on the lithium metal target may be removed by directed gas flow and/or vacuum cleaning.

Figure 3:
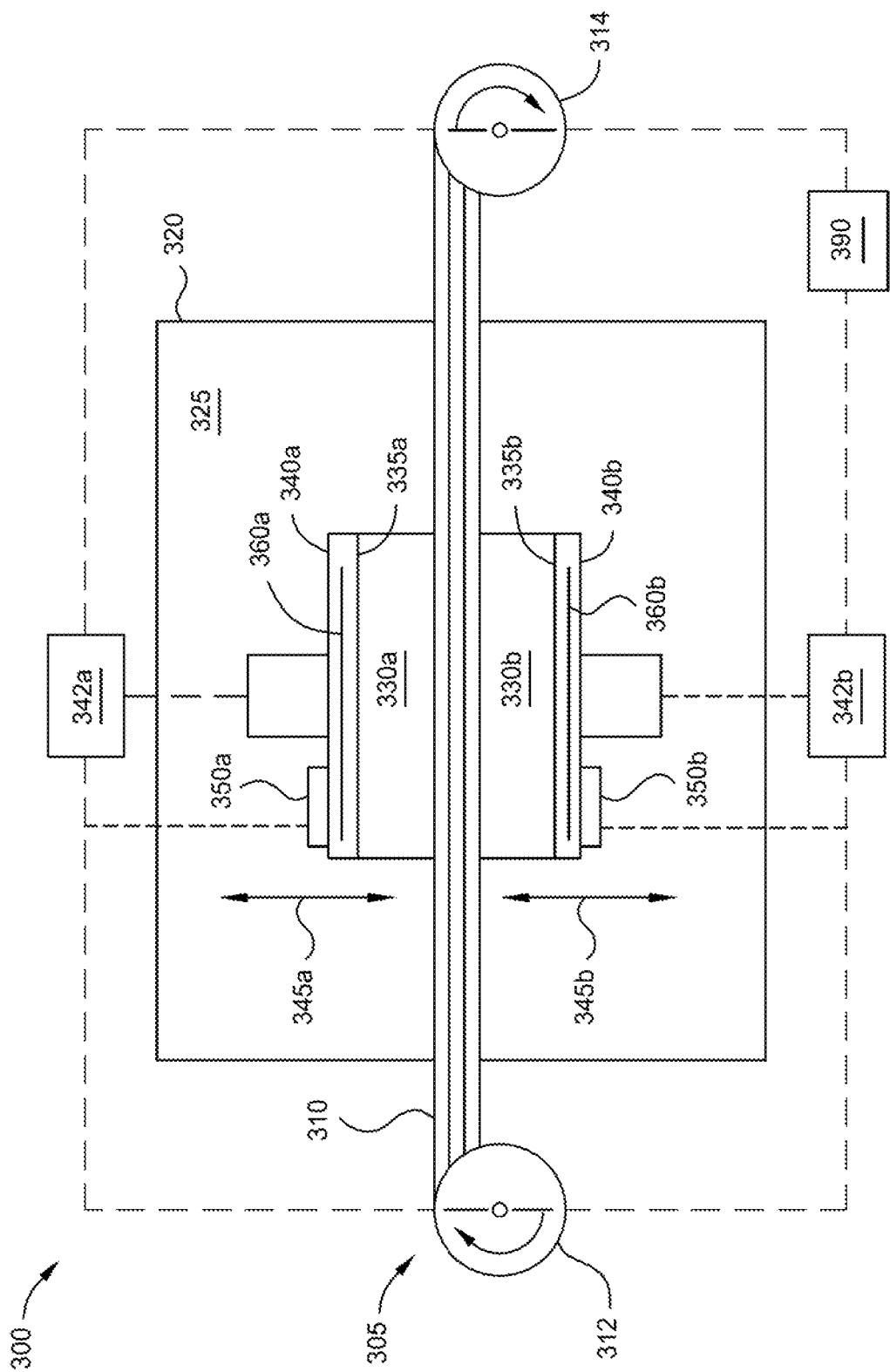
FIG. 3 illustrates a schematic view of an integrated processing tool according to implementations described herein.

FIG. 3 illustrates a schematic view of an integrated processing system 300 according to implementations described herein. The pre-lithiation process described herein, for example, the pre-lithiation process of processing sequence 200 may be performed on the integrated processing system 300. The integrated processing system 300 includes a pre-lithiation module 320 configured to perform the processing sequence 200 on a continuous sheet of material 310. In one implementation, the continuous sheet of material 310 includes a prefabricated electrode, for example, the dual-sided electrode structure 170 depicted in FIG. 1B. The prefabricated electrode may include cathode material formed on a current collector or anode material formed on a current collector as described herein. In certain implementations, the pre-lithiation module 320 is configured to process both sides of the continuous sheet of material 310. The pre-lithiation module 320 defines a processing region 325. The processing region 325 typically includes a controlled environment, e.g., the atmosphere as previously described herein. Although the integrated processing system 300 is configured to process a horizontally oriented continuous sheet of material 310, the integrated processing system 300 may be configured to process substrates positioned in different orientations, for example, a vertically oriented continuous sheet of material 310. In certain implementations, the continuous sheet of material 310 is a flexible conductive substrate or web.

In certain implementations, the integrated processing system 300 comprises a transfer mechanism 305. The transfer mechanism 305 may comprise any transfer mechanism capable of moving the continuous sheet of material 310 through the processing region 325 of the pre-lithiation module 320. The transfer mechanism 305 may comprise common transport architecture. The common transport architecture may comprise a reel-to-reel system with a common take-up-reel 314 and a feed reel 312 for the system. The take-up reel 314 and the feed reel 312 may be individually heated. The take-up reel 314 and the feed reel 312 may be individually heated using an internal heat source (not shown) positioned within each reel or an external heat source. The common transport architecture may further comprise one or more intermediate transfer reels (not shown) positioned between the take-up reel 314 and the feed reel 312.

The integrated processing system 300 comprises the feed reel 312 and the take-up reel 314 operable to move the continuous sheet of material 310 through the pre-lithiation module 320 where the continuous sheet of material 310 (i.e., prefabricated electrode) is pre-lithiated, for example, by the processing sequence 200. The pre-lithiation module 320 includes a lithium metal target 330a, 330b (collectively 330) for contacting and supplying lithium to the continuous sheet of material 310. The pre-lithiation module 320 further includes a press 340a, 340b (collectively 340) operable to move the lithium metal target 330 into contact with the continuous sheet of material 310 along the direction identified by arrow 345a, 345b. Any suitable press may be used, such as, for example, a mechanical press, a hydraulic press, a screw press, a crank press, a knuckle joint press, an eccentric press, or a rack and pinion press. In one implementation, the press 340 is a mechanical press. The press 340 is also capable of applying uniform pressure to a back surface 335a, 335b (collectively 335) of the lithium metal target 330. The press 340 may be coupled with a motor 342a, 342b (collectively 342) operable to move the press along the direction identified by arrow 345.

The pre-lithiation module 320 further includes one or more ultrasonic transducers 350a, 350b (collectively 350) positioned in the processing region 325 and operable to apply ultrasonic energy. The ultrasonic transducer 350 is configured to provide ultrasonic energy to the lithium metal target 330 to decrease the time for pre-lithiation of the prefabricated electrode. The ultrasonic transducer 350 may generate transverse and/or longitudinal ultrasound waves. The ultrasonic transducer 350 may be implemented, for example, using piezoelectric actuators, or any other suitable mechanism that can generate vibrations at ultrasonic frequencies of targeted amplitude. The ultrasonic transducer 350 may comprise a single transducer, as shown in FIG. 3, or an array of multiple transducers, oriented to direct ultrasonic energy toward the lithium metal target 330 and/or the prefabricated electrode. When the ultrasonic transducer 350 directs energy toward the lithium metal target 330 and/or the prefabricated electrode, acoustic streaming helps to distribute lithium from the lithium metal target 330 into the prefabricated electrode. The ultrasonic transducer 350 may be positioned to direct ultrasonic energy in a direction normal to the back surface 335 of the lithium metal target 330 or at an angle from normal. In one implementation, the ultrasonic transducer 350 is dimensioned to be approximately equal in size to the back surface 335 of the lithium metal target 330. In one implementation, the ultrasonic transducer 350 is coupled with an RF power supply.

While only one ultrasonic transducer 350 is shown, multiple transducers may be used with certain embodiments. For example, additional transducers may be placed along the side of the lithium metal target 330 to direct ultrasonic energy toward the lithium metal target 330 from the side. Although the ultrasonic transducer 350 is shown as cylindrical, it should be understood that transducers of any shape may be used with the embodiments described herein. In addition, although the ultrasonic transducer 350 is shown as contacting the press 340, the ultrasonic transducer 350 may be positioned at other locations within the processing region 325.

The pre-lithiation module 320 further includes one or more heat sources 360a, 360b (collectively 360) positioned in the processing region 325. The one or more heat sources 360 are configured to heat the lithium metal target 330. In one implementation, as shown in FIG. 3, the one or more heat sources 360 are embedded in the in the press 340. Although shown as embedded in the press 340, it should be understood that the heat sources may be positioned in other non-embedded locations capable of heating the lithium metal target 330. In one implementation, the one or more heat sources 360 are resistive heaters. Alternatively, the one or more heat sources 360 may comprise a source of radiant heat (not shown), such as gas-filled lamps and the like.

Generally, the integrated-processing system 300 includes a system controller 390 configured to control the automated aspects of the system. The system controller 390 facilitates the control and automation of the overall integrated-processing system 300 and may include a central processing unit (CPU) (not shown), memory (not shown), and support circuits (or I/O) (not shown). The CPU may be one of any form of computer processors that are used in industrial settings for controlling various chamber processes and hardware (e.g., conveyors, motors, fluid delivery hardware, etc.) and monitor the system and chamber processes (e.g., substrate position, process time, detector signal, etc.). The memory is connected to the CPU, and may be one or more of a readily available memory, such as random access memory (RAM), read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the system controller 390 determines which tasks are performable on a substrate. Preferably, the program is software readable by the system controller 390, which includes code to generate and store at least substrate positional information, the sequence of movement of the various controlled components, and any combination thereof.

In some implementations, the finished negative electrode will not be collected on take-up reel 314 as shown in the figures, but may go directly for integration with the separator and positive electrodes, etc., to form battery cells.

Implementations

Clause 1. A method of fabricating a pre-lithiated electrode, comprising disposing a lithium metal target comprising a layer of lithium metal or a lithium metal alloy adjacent to a surface of a prefabricated electrode; heating at least one of the lithium metal target and the prefabricated electrode to a temperature less than or equal to 180 degrees Celsius; compressing the lithium metal target and the prefabricated electrode together; and applying ultrasound to the lithium metal target to transfer a quantity of lithium from the lithium metal target to the prefabricated electrode.

Clause 2. The method of clause 1, further comprising separating the lithium metal target from the surface of the prefabricated electrode to form the pre-lithiated electrode.

Clause 3. The method of clause 1 or 2, wherein compressing the lithium metal target comprises applying uniform pressure to a back surface of the lithium metal target.

Clause 4. The method of any of clauses 1 to 3, wherein the uniform pressure is a pressure ranging from about 0.1 MPa to about 10 MPa.

Clause 5. The method of any of clauses 1 to 4, wherein the compressing occurs by disposing the lithium metal target on a first plate and the prefabricated electrode on a second plate and applying pressure between the first plate and the second plate.

Clause 6. The method of any of clauses 1 to 5, wherein the ultrasound has a frequency band between about 20 KHz and about 1 GHz.

Clause 7. The method of any of clauses 1 to 6, wherein the ultrasound has an intensity between about 0.1 W/cm$^2$ and about 100 W/cm$^2$.

Clause 8. The method of any of clauses 1 to 7, wherein the temperature is between 100 degrees Celsius and 150 degrees Celsius.

Clause 9. The method of any of clauses 1 to 8, wherein the electrode is a negative electrode comprising a carbonaceous material, silicon, tin, or combinations thereof.

Clause 10. The method of clause 9, wherein the carbonaceous material is selected from natural graphite, artificial graphite, or combinations thereof.

Clause 11. The method of any of clauses 1 to 8, wherein the electrode is a positive electrode comprising a lithium intercalation material.

Clause 12. The method of any of clauses 1 to 11, wherein the lithium metal target has a thickness of greater than or equal to 100 µm.

Clause 13. The method of any of clauses 1 to 12, wherein heating and compressing occur for a time period greater than or equal to about 1 minute.

Clause 14. The method of any of clauses 1 to 13, wherein compressing the lithium metal target and the prefabricated electrode together is performed in an atmosphere comprising a noble gas.

Clause 15. The method of clause 14, wherein the noble gas is argon gas.

Clause 16. The method of any of claims 1 to 15, wherein the lithium metal target comprises lithium and aluminum and aluminum is present in from about 0.1 wt. % and 10 wt. % of the total weight of the lithium metal target.

Clause 17. The method of any of clauses 1 to 16, wherein the method further comprises incorporating the pre-lithiated electrode into an electrochemical cell further comprising a positive electrode, a separator, and an electrolyte.

Clause 18. A lithium-ion battery cell comprising a pre-lithiated negative electrode formed according to the method of any of clauses 1 to 17; a positive electrode comprising oxides of a transition metal; and an electrolyte, wherein the electrolyte is selected from a solid electrolyte, a liquid electrolyte, or a polymer electrolyte.

Clause 19. The lithium-ion battery cell of clause 18, wherein each of the negative electrode and the positive electrode are in a fully charged position.

Clause 20. The lithium-ion battery cell of clause 19, wherein the fully charged position of the negative electrode is further defined as the negative electrode being completely lithiated and the fully charged position of the positive electrode is further defined as the positive electrode being completely delithiated.

Clause 21. An integrated processing system operable to form a pre-lithiated electrode according on any of clauses 1 to 20, comprising a reel-to-reel system operable to transport a continuous sheet of material through one or more processing chambers; and a pre-lithiation module the defines a processing region and is adapted to process the continuous sheet of material, comprising a lithium metal target operable to contact and supplying lithium to the continuous sheet of material; a press coupled with the lithium metal target and operable to move the lithium metal target into contact with the continuous sheet of material; one or more ultrasonic transducers positioned in the processing region and operable to apply ultrasonic energy to the lithium metal target; and one or more heat sources positioned in the processing region and operable to heat the lithium metal target.

In summary, some of the benefits of some of the implementations described herein include pre-lithiation processes for pre-lithiating coated electrodes (negative, positive) used in the lithium-ion batteries. The pre-lithiation processes described herein are applicable to lithium-ion batteries using solid electrolytes (e.g., solid-state batteries) as well as lithium-ion batteries, which use liquid or polymer electrolytes. The pre-lithiation processes described herein are enabled by dry direct contact (DDC) between lithium metal targets and coated electrodes while controlling at least one of a temperature of the lithium metal target, pressure between the lithium target and the coated electrode, and/or the application of ultrasound (e.g., ultrasonic energy). The residence time for pre-lithiation of the coated electrodes described herein is controlled and shortened by controlling temperature, pressure, ultrasound frequency band and/or intensity. Pre-lithiation of coated electrodes allows for (1) an increase in the lithium-ion battery energy density (kWh), and (2) reduction of the cathodic coating loading for the anode/cathode balancing, specifically the costly elements of cobalt and nickel. Thus, pre-lithiation process described herein has a direct impact on the main figure of merit, cost/kWh, used in the lithium-ion battery manufacturing (HVP). Not to be bound by theory, but it is believed that ultrasound enhances the diffusion coefficient in solids at least by one order of magnitude thus reducing diffusion time. The pre-lithiation process described herein is suitable for any coated electrodes: either negative or positive. The pre-lithiation process described herein provides battery manufacturers with great flexibility in cell balancing: independently matching reversible anode/cathode capacities, irreversible anode/cathode capacities.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the disclosure may be devised without departing from the basic scope thereof, and the scope thereof is determined by the claims that follow.

The invention claimed is:

1. A method of fabricating a pre-lithiated negative electrode, comprising:
    providing a lithium metal target having a target body defined by a front surface and a back surface opposing the front surface, the lithium metal target comprising lithium metal or a lithium metal alloy;
    disposing the front surface of the lithium metal target adjacent to a surface of a negative electrode;
    heating at least one of the lithium metal target and the negative electrode to a temperature less than or equal to 180 degrees Celsius;
    compressing the lithium metal target and the negative electrode together, wherein compressing the lithium metal target and the negative electrode together comprises contacting the front surface of the lithium metal target with the surface of the negative electrode; and
    applying ultrasound to the lithium metal target to transfer a quantity of lithium from the lithium metal target to the negative electrode, wherein the ultrasound is directed toward the back surface of the lithium metal target.

2. The method of claim 1, further comprising:
    separating the lithium metal target from the surface of the negative electrode to form the pre-lithiated negative electrode.

3. The method of claim 1, wherein compressing the lithium metal target comprises applying uniform pressure to the back surface of the lithium metal target.

4. The method of claim 3, wherein the uniform pressure is a pressure ranging from about 0.1 MPa to about 10 MPa.

5. The method of claim 1, wherein the compressing occurs by disposing the lithium metal target on a first plate and the negative electrode on a second plate and applying pressure between the first plate and the second plate.

6. The method of claim 1, wherein the ultrasound has a frequency band between about 20 KHz and about 1 GHz.

7. The method of claim 6, wherein the ultrasound has an intensity between about 0.1 W/cm$^2$ and about 100 W/cm$^2$.

8. The method of claim 1, wherein the temperature is between 100 degrees Celsius and 150 degrees Celsius.

9. The method of claim 1, wherein the negative electrode comprises a carbonaceous material, silicon, tin, or combinations thereof.

10. The method of claim 9, wherein the carbonaceous material is selected from natural graphite, artificial graphite, or combinations thereof.

11. The method of claim 1, wherein the lithium metal target has a thickness of greater than or equal to 100 μm.

12. The method of claim 1, wherein heating and compressing occur for a time period greater than or equal to about 1 minute.

13. The method of claim 1, wherein compressing the lithium metal target and the negative electrode together is performed in an atmosphere comprising a noble gas.

14. The method of claim 13, wherein the lithium metal target comprises lithium and aluminum and aluminum is present in from about 0.1 wt. % and 10 wt. % of the total weight of the lithium metal target.

15. The method of claim 1, further comprising incorporating the pre-lithiated negative electrode into an electrochemical cell, wherein the electrochemical cell further comprises a positive electrode and an electrolyte.

16. The method of claim 15, wherein the positive electrode comprises oxides of a transition metal and the electrolyte is selected from a solid electrolyte, a liquid electrolyte, or a polymer electrolyte.

17. The method of claim 16, wherein each of the pre-lithiated negative electrode and the positive electrode are in a fully charged position.

18. The method of claim 17, wherein the fully charged position of the pre-lithiated negative electrode is further defined as the pre-lithiated negative electrode being completely lithiated and the fully charged position of the positive electrode is further defined as the positive electrode being completely delithiated.

19. The method of claim 1, wherein compressing the lithium metal target and the negative electrode together and applying the ultrasound to the lithium metal target at least partially overlap.

20. The method of claim 1, wherein the ultrasound is directed in a direction normal toward the back surface of the lithium metal target.

* * * * *